United States Patent [19]

Yamamoto et al.

[11] Patent Number: 5,583,646
[45] Date of Patent: Dec. 10, 1996

[54] APPARATUS FOR DISTINGUISHING IMAGE PORTIONS THROUGH IMAGE EXPANSION

[75] Inventors: Naofumi Yamamoto, Tokyo; Hidekazu Sekizawa, Yokohama; Eiichi Sakaue, Urayasu, all of Japan

[73] Assignee: Kabushiki Kaisha Toshiba, Japan

[21] Appl. No.: 570,254

[22] Filed: Dec. 11, 1995

Related U.S. Application Data

[63] Continuation of Ser. No. 219,094, Mar. 29, 1994, abandoned.

[30] Foreign Application Priority Data

Mar. 31, 1993 [JP] Japan ................................. 5-074843

[51] Int. Cl.$^6$ ................................................. H04N 1/21
[52] U.S. Cl. ........................ 358/296; 382/268; 382/269
[58] Field of Search ................................ 382/113, 176, 382/181, 194, 199, 200, 268, 269; 358/296, 518, 515, 516, 529, 530, 532; 347/15, 43

[56] References Cited

U.S. PATENT DOCUMENTS 4,667,250  5/1987  Murai ........................................ 358/296
5,195,175  3/1993  Kamno et al. ............................ 395/106
5,331,442  7/1994  Sorimachi ................................ 358/532

FOREIGN PATENT DOCUMENTS

0431960A2  6/1991  European Pat. Off. .
2-199588  8/1990  Japan .

OTHER PUBLICATIONS

Takashi Saitoh and Theo Pavlidis, "Page Segmentation without Rectangle Assumption", 1992 IEEE, vol. II, Conference B, pp. 277–280.

Primary Examiner—John E. Barlow, Jr.
Attorney, Agent, or Firm—Limbach & Limbach LLP

[57] ABSTRACT

An image processing apparatus for performing predetermined processing on an image of a document having a character/line portion, a gradation portion and a background portion. The apparatus reads the document image, converts image densities to binary pixel data, and expands the black pixels in the vertical and horizontal directions. Using this expanded image, character/line, gradation and background portions can be accurately distinguished from each other.

9 Claims, 9 Drawing Sheets

APPARATUS FOR DISTINGUISHING IMAGE PORTIONS THROUGH IMAGE EXPANSION

This is a continuation of application Ser. No. 08/219,094 filed on Mar. 29, 1994, abandoned.

BACKGROUND OF THE INVENTION

1. Field of the Invention

The present invention relates to an image field distinguishing apparatus for distinguishing character/line portions from gradation portions of a character/line/gradation-mixed image read from a document by means of a scanner, etc.

2. Description of the Related Art

In recent years, apparatus, such as a facsimile equipment, document file, digital copying machine, etc., have increasingly been able to handle a document image in the form of a digital signal. By handling images as digital signals, many advantages can be obtained, such as various edit/correction processing, and electronic recording and transmission. Such a digital image processing apparatus has conventionally been used to mainly handle black/white binary images, such as characters and lines. A growing demand has recently been made for an apparatus capable of handling a gradation-mixed image.

Recording an image in the form of a hard copy poses a problem from the standpoint of handling a character/line/gradation-mixed image. As a recording method for obtaining a hard copy, use has often been made of a melt thermal transfer system and electrophotographic system. These recording systems have a capacity to represent a density of two or merely several levels per recording image spot. For this reason, techniques, such as an area modulation method, are employed to represent a gradation image. The area modulation method is used to represent a gradation portion by combining together a plurality of image spots. Typically, a systematic dithering method, or other methods known in the art, are used.

The systematic dithering method is theoretically a recording method for achieving a compatibility between the image resolution and the gradation portion. However, this method has drawbacks in that characters/lines are feebly reproduced at their edges through a document reading system. Also, moire noise is produced in a dot pattern document. The character/line information is a very important part of the document image and, further, dot pattern printing is often used to represent a gradation image or portion in the document image. Therefore, these drawbacks of systematic dithering can cause problems with the document image.

Image field distinguishing processing is known to eliminate these drawbacks and to effect image recording in a manner to achieve the image resolution/gradation compatibility. This is a technique for distinguishing a recording image into, for example, a character/line preference portion and a gradation preference portion. The gradation preference portion may be a photo image or dot pattern. In image field distinguishing processing, recording processing is performed in accordance with the results of the distinction.

JPN PAT APPLN KOKAI PUBLICATION 2-199588 has proposed, as one image field distinguishing system, an image field distinguishing method utilizing a feature wherein the characters are finer and narrower than the gradation images. This method comprises subjecting an input image to binary processing in accordance with its density levels to provide white pixel and black pixel portions and distinguishing a white pixel portion of greater area as a background portion and a black pixel portion of smaller area, bounded by the background portion, as a character/line portion. However, a drawback of this method is that since such a method determines, as the background portion, a relatively broad range white portion corresponding to the input image, there is a possibility that a low density gradation portion (low area percentage portion) will be incorrectly determined to be a background portion. That is, there is a problem that distinguishing accuracy is low for some dot patterns.

Further, from the standpoint of the necessity to perform image field distinguishing processing in real time, the character/line portion has to be determined from image signals obtained through the raster scanning of a document, that is, from image signals sequentially input along a horizontal direction. This poses a problem because narrow lateral lines, that is, narrow lines parallel to the horizontal scanning direction, may not be distinguished from the character/line portion.

SUMMARY OF THE INVENTION

The present invention relates to an image field distinguishing apparatus for correctly distinguishing an image field on fine lines in a horizontal direction and for correctly distinguishing an image field on a low density portion of a dot pattern.

According to the present invention, there is provided an image processing apparatus for performing predetermined processing on an image of a document having an image portion and a background portion other than the image portion, comprising; means for reading the image of the document so as to convert the image to an image signal composed of black and white pixels; means for forming an expansion image by converting a white pixel array to a black pixel portion when the white pixel array corresponding to a predetermined number of pixels is continuous adjacent to the black pixel portion of the image signal received from the reading means; and means for recognizing that portion, corresponding to the white pixel portion in the document image containing the expansion image formed by the expansion image forming means, as the background portion of the document.

The present embodiment includes a means for forming an expansion image by converting a white pixel array to a black pixel portion. By such expansion forming means, horizontal direction fine lines and a low density portions of the gradation portion, which have previously been erroneously recognized in practical application, are expanded (i.e., augmented) with black pixels. With this expansion, these features can be recognized without going undetected. It is thus possible, according to the present invention, to provide an image field distinguishing apparatus which can positively and correctly recognize even those thin lines and low density portion.

According to the present invention, when expanding processing is done on the binary image signal, the dot-to-dot distance in a dot pattern is made smaller than the distance of those black portions constituting a character/line portion. The dot pattern portions, when expanded by a properly selected expansion length become connected together to provide a connected black unit. On the other hand, the character/line black portions, even upon being expanded, still have those isolated portions and are not joined together as a connected black unit.

After the black portions have been expanded, if white portions are joined or connected together to a given length, this will be determined as a background portion. The white portions are dispersed over a dot pattern will be subsumed in a connected black unit after the image expansion (as explained above) and, therefore, not be erroneously determined as belonging to the background portion.

After the expansion processing is carried out, the black portion of a nonbackground portion, being smaller in size than a given threshold value, is treated as a character/line portion and larger black portions are treated as a gradation image portion. Thereby it is possible to distinguish the dot pattern from a connected or joined portion of broader area, such as a photo image, that is, from a gradation portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The embodiments of the present invention will be explained below with reference to the accompanying drawings.

Figure 1A:
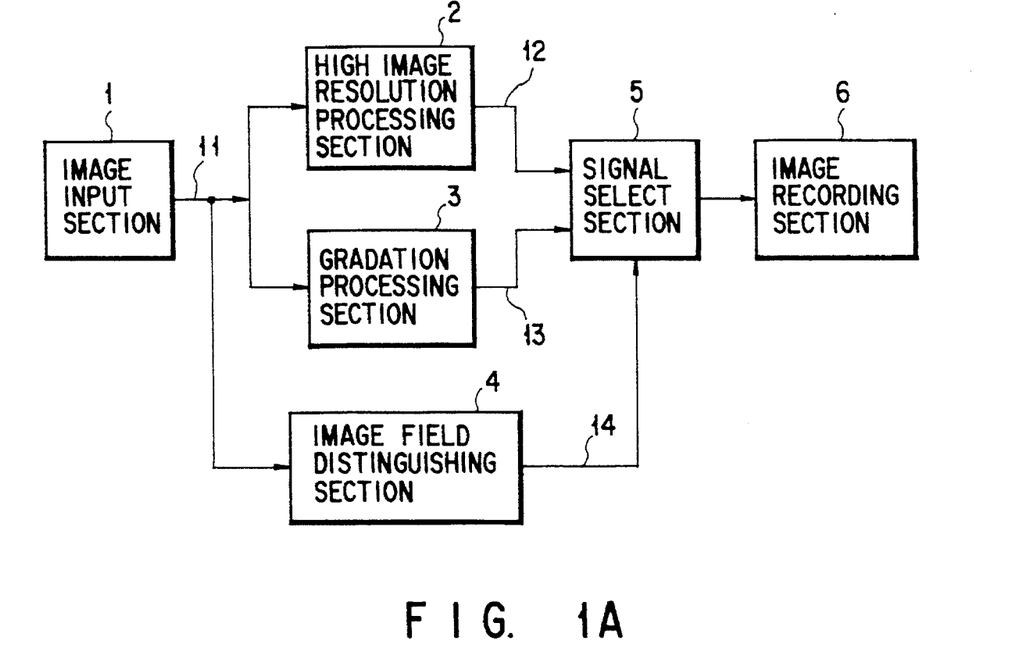
FIG. 1A is a block diagram showing a digital image copying apparatus using an image field distinguishing apparatus according to one embodiment of the present invention.
Figure 1B:
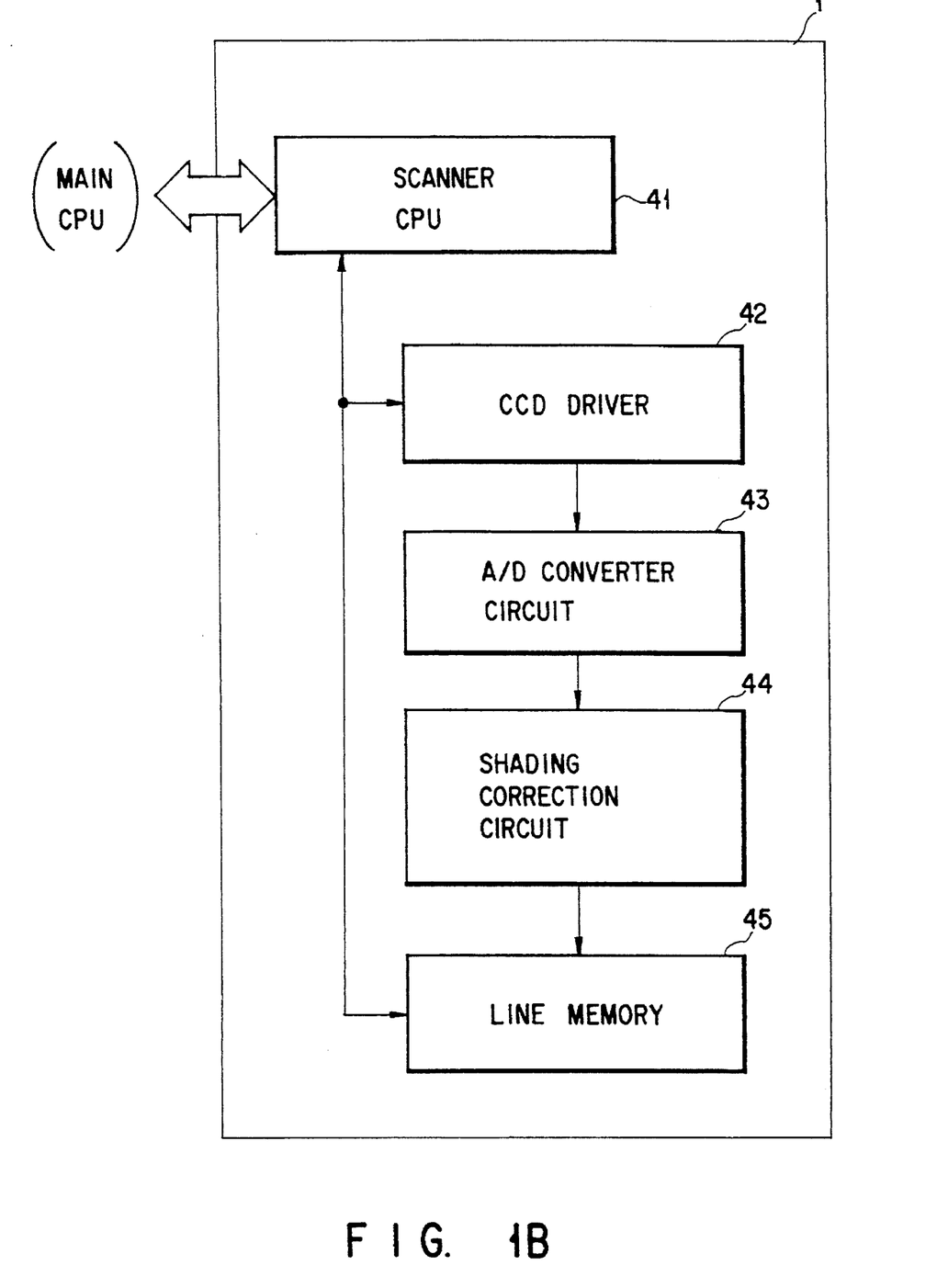
FIG. 1B is a block diagram showing one form of an image input section in FIG. 1A.

FIG. 1A is a block diagram showing an arrangement of a digital image copying apparatus including an image field distinguishing apparatus. FIG. 1B is a block diagram showing one form of an image input section of FIG. 1A. The digital image copying apparatus comprises an image input section 1, an image field distinguishing section 4, a high image resolution distinguishing section 2, a gradation processing section 3, a signal select section 5 and an image recording section 6. The edit processing section for performing edit processing, such as scaling, trimming, masking, etc., has no direct relevancy to the present invention and, therefore, is omitted. Note that such edit processing can be performed just after, for example, the image input section 1.

Figure 3:
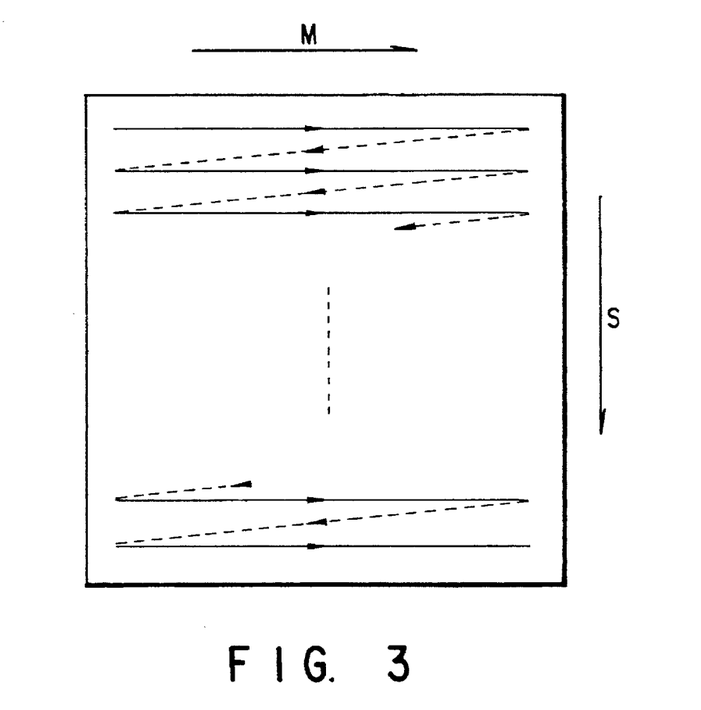
FIG. 3 is a view showing scanning made on a document image on the present embodiment.

The image input section 1 reads a document image by scanning it by, for example, a CCD line sensor, in a raster scanning mode, that is, in the horizontal and vertical directions as shown in FIG. 3. The image input section 1 takes out time-sequence electrical signals corresponding to the brightness levels of respective pixels. After being converted by an A/D converter to digital signals, these signals are subjected to shading correction processing and output as image signals 11. The shading correction processing corrects uneven sensitivity and uneven illumination of respective sensor elements in a CCD line sensor. This processing provides standardization on which the image signals 11 go to "0" and "1" against a black and a white portion on a document image.

The image input section 1 of FIG. 1B comprises a scanner CPU 41, CCD driver 42, A/D converter 43, shading correction circuit 44, and line memory 45. In this arrangement, the scanner CPU 41 manages the scanning operation by acting on the other units 42 to 45 by a corresponding instruction from a main CPU, not shown. The CCD driver 42 drives a CCD sensor 336 (FIG. 12) to pick up the image information from a document to allow an image to be distinguished. Here, the picked-up image data is converted by the A/D converter 43 to a digital signal and corrected by the shading correction circuit 44 in accordance with the shading of the image involved. This corrected digital signal is held in the line memory 45.

Image signals 11 are delivered as output signals to the high image resolution section 2, gradation processing section 3 and image field distinguishing section 4 (as shown in FIG. 1A). The image field distinguishing section 4 receives the image signals 11 and distinguishes them as character/line portions (binary portions calling for an image resolution) or gradation portions (areas calling for gradation).

The high image processing section 2 converts the received image signals to high resolution recording signals (resolution preference signals) 12 and the gradation processing section 3 converts the received image signals to gradation recording signals (gradation preference signals) 13. This processing will be described in more detail below.

Depending upon an image field distinguishing signal 14 sent from the image field distinguishing section 4, the image select section 5 selects the high resolution recording signal 12 when the image field distinguishing signal 14 represents the character/line portion and the gradation recording signal 13 when the image field distinguishing signal represents the gradation portion. The signal select section 5 sends a selected signal to an image recording section 6 where image recording is made in accordance with the signal sent from the signal select section 5. A resultant signal is output as a hard copy.

Figure 4:
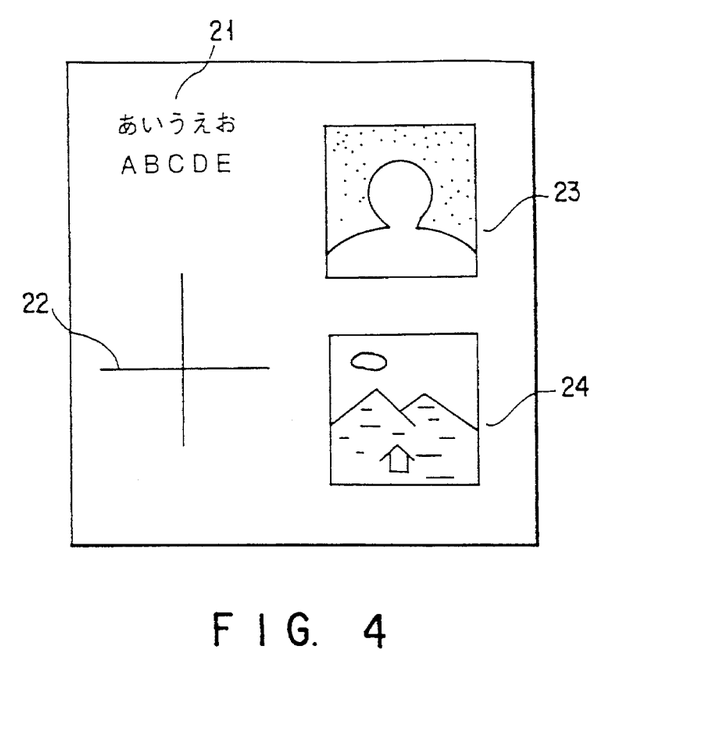
FIG. 4 is a one form of an image on the present embodiment.

The present invention will be explained below in more detail in conjunction with the image field distinguishing section 4. First, explanation will be given below about the principle on which an image field is distinguished. Here a distinction is made based on the structural property of a document image. As shown in FIG. 4, most of document images are comprised of a mixture of characters 21, lines (drawings) 22, dot pattern 23 and photo image 24, against a uniform low-density background. Of these, the characters and lines are represented at a high density and composed of fine lines of a few millimeters or less in thickness (except for special characters and lines). The dot pattern 23 represents a gradation image, as does the photo image 23. A gradation image is comprised of medium to high density pixels over its whole surface. These dots, or pixels, are continuously dispersed over a wider area. The size of the entire gradation image is usually over a few centimeters square.

A mixed image of a line/character and gradation areas, if representing its low-density level as a binary threshold level, varies such that the character/line portion is converted to a small black area surrounded by a white background and the gradation portion is converted to a greater, black-portion connected area. The gradation portion may contain some white portions in its low density areas, but these white portions are small isolated portions. In order to distinguish the image field, a white area potion connected to another white region after binarization is determined to be a background portion.

The background portion so determined in this way generally corresponds to a background region of a document image, but the dot pattern portion may also contain relatively wide or large white-connected portions. These wide white-connected portions are likely to be erroneously determined as being a background region. According to the present invention, the black portion of the binary image is subjected to expansion processing prior to determining the presence of the background region so as to prevent any possible connection between the white portion of the dot pattern and the background region. By so doing it is possible to prevent the dot pattern portion from being erroneously determined as being a background portion. The background is intended to mean a document region other than an image area on the document.

It is thus possible to distinguish a small or narrow black portion, surrounded by a background portion determined in this way, from the character/line portion. By so doing, the gradation portion is found to be an almost black region, but it is distinguished from the character portion because the gradation portion is broader or wider. This enables the gradation portion to be correctly distinguished from the character/line portion.

A practical processing algorithm run by the image field distinguishing section 4 will be explained below by taking an exemplary result of such processing.

Figure 2:
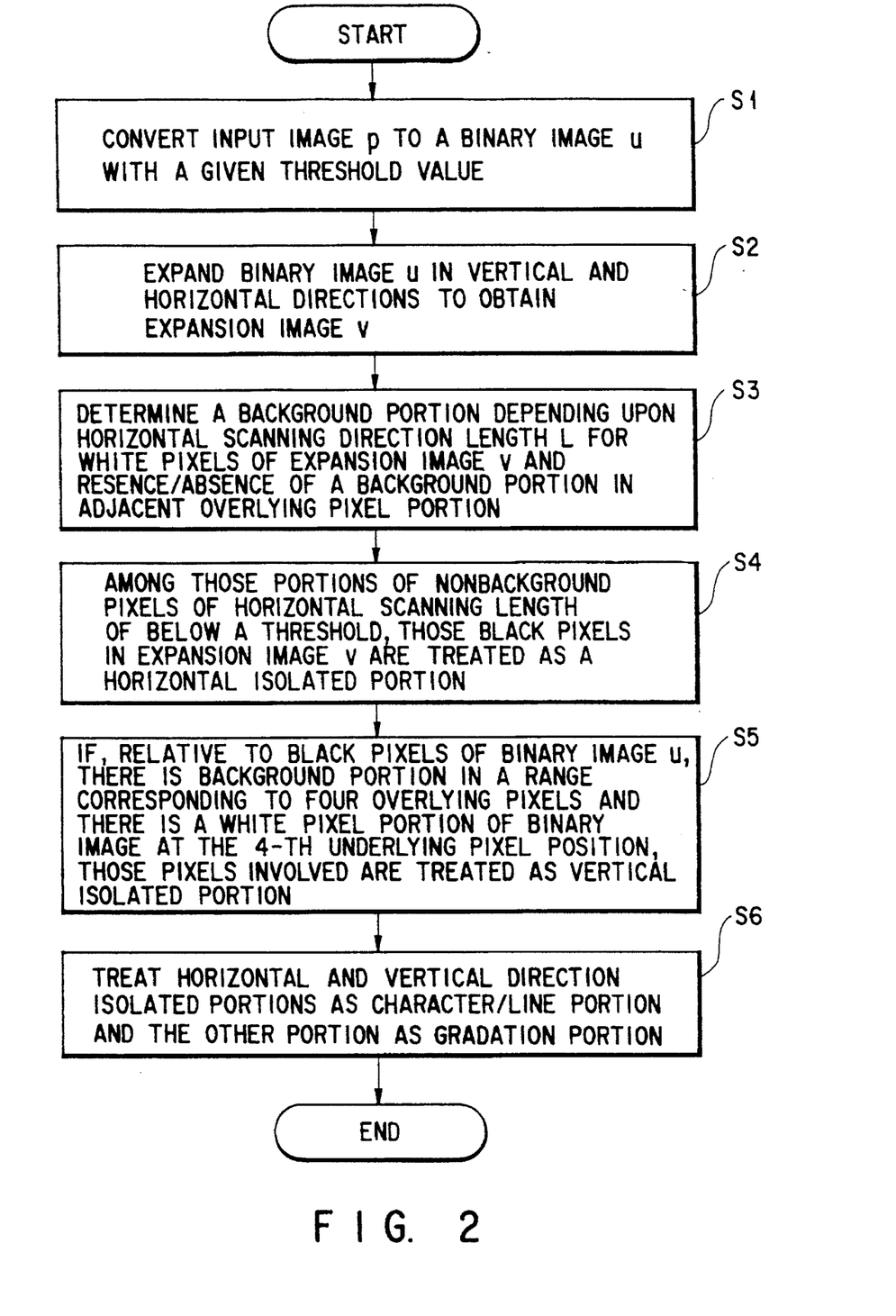
FIG. 2 is a flow chart showing an algorithm of the present embodiment.

FIG. 2 is a flow chart showing the processing algorithm. FIGS. 4 to 8, each, show an example of an image during processing. At the image input section 1 in FIG. 1, horizontal scanning is performed by a CCD line sensor in line units and the determination of the background portion and distinction of the character/line portion are performed for each line. Referring to the result of the determination and distinction of the background portion in a preceding line, vertical scanning sequentially progresses. Here it is assumed that, for convenience, the horizontal scanning direction is a lateral direction from left to right and the vertical scanning is an up/down direction and that the image signals 11 represent those signals sequentially obtained as shown in FIG. 3.

First, the image signal 11 of the image input section 1 is converted by a predetermined threshold value Tb to a corresponding binary value signal to obtain a binary image signal μ (step S1). Here, the threshold value Tb is set to be a density level somewhat greater than the background density level normally used. According to the present embodiment, Tb=0.75 in terms of a relative reflectance, taking into consideration typical reference values for recycled paper and pale color paper which serves as the background.

Figure 5:
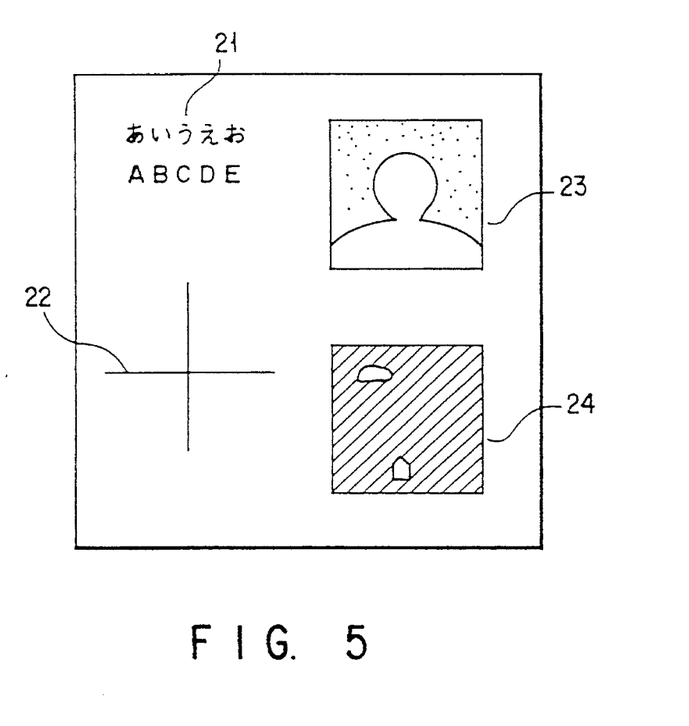
FIG. 5 is a view showing a binary image on a document in FIG. 4.

FIG. 4 shows a document image as an input image and FIG. 5 shows a corresponding binary image. For the binary image, characters and lines 21 and 22 are all represented by black. For the photo image 24, there is normally a high density percentage area and, since the binary threshold level is near-white, much of the area goes black. For the dot pattern 23, black/white dots emerge and white pixel portions are connected, in particular, at a low density level and a dot area percentage of below about 50%.

The binary image μ obtained at step S1 is subjected to expansion processing (step S2) by expanding the black pixels in the up/down direction (vertical-down direction) and horizontal direction (horizontal-right direction). That is, vertical expansion processing relates to an expansion made in a vertical scanning directions and horizontal expansion processing relates to an expansion made in a horizontal scanning direction M.

Figure 9:
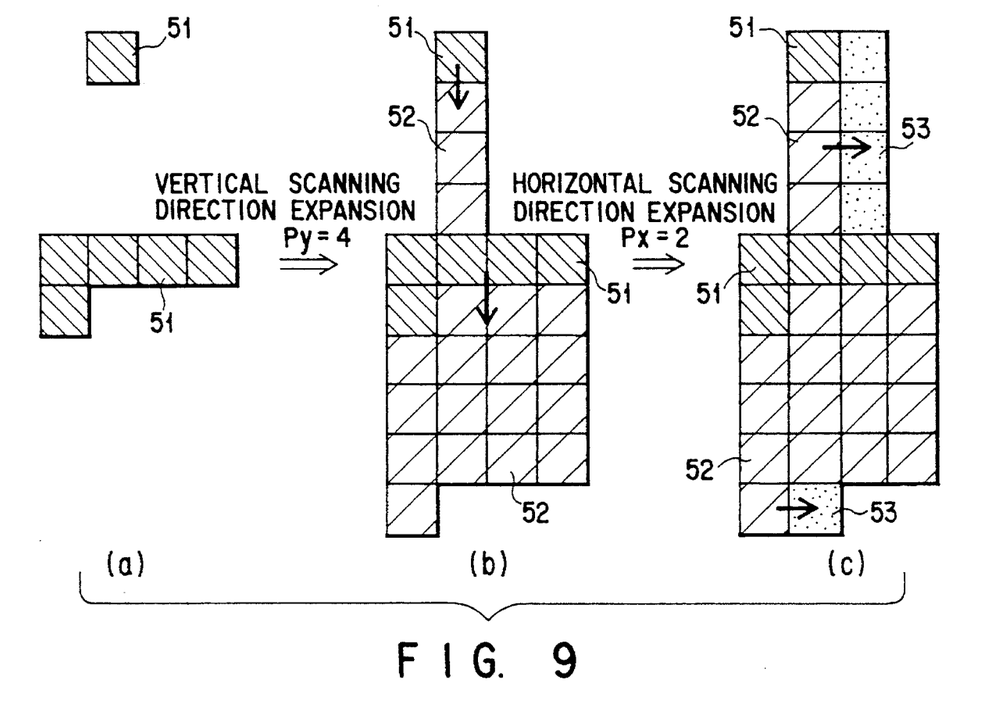
FIG. 9 is an explanative view showing an expansion processing operation by the present embodiment.

FIG. 9 shows expansion processing made on those black pixels of the binary image in the vertical-down direction and horizontal-right direction. FIG. 9(a) shows black pixels 51 of the original image. FIG. 9(b) shows black pixels 51 and expansion areas 52 after expansion in the vertical direction. FIG. 9(c) shows expansion pixels 53 into which the black pixels 51 and expansion pixels 52 in FIG. 9(b) are further expanded by horizontal expansion.

If, in FIG. 9(b), there are any white pixels from a given black pixel down to a Py pixel (in this case, Py=4), intervening white pixels are so processed as to be converted to black expansion pixels 52.

For those black pixels having a continuous horizontal run of less than a length Px (in this case, Px=2) in the horizontal direction in FIG. 9(c), expansion processing is performed so that those white pixels situated on the right side of these black pixels are converted to black expansion pixels 53 to meet Px=2.

Figure 6:
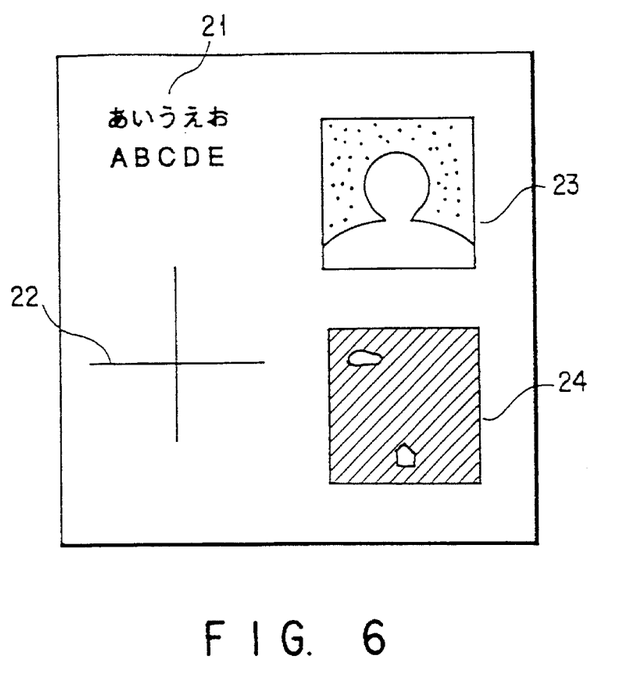
FIG. 6 is a view showing an image expanded as the binary image in FIG. 5.

Let it be assumed that the expansion-processed image is given by an expansion image V. FIG. 6 shows an expansion image obtained through the expansion processing of those black areas of the binary image in FIG. 5.

The expansion processing as set out above is performed to break a connection of those white portions in the dot pattern 23. This is done so that low-density (nearly-white) portions in the dot pattern will not be incorrectly determined as a background portion. If, here, the expansion pixel numbers Py and Px are selected as to be greater than the dot-to-dot spacing of gradation portions but smaller than a minimal spacing between the character/line areas, then black pixels in the dot pattern 23 will be connected and the characters and lines will still exhibit isolated white pixel areas so that the black pixel areas are not connected. In the example of FIG. 9, Py=4 and Px=2 making it is possible to practically connect together those dots corresponding to a 65 lines/inch range.

For the expansion image V obtained at step S2, the background portion is determined from the size and connection of the white portions involved (step S3). Practically, the length L of those white pixels connected together in the horizontal direction is measured so as to examine the size of the white portion in the expansion image V. In order to examine the connected length of the white portion, it is determined whether or not any adjacent image or images in the pixel array belong to the background portion. If, as a result of determination, either of the following conditions 1 or 2 is satisfied, then corresponding pixels in the pixel array are determined as being a background portion and the remaining parts of the pixel array (including a black pixel or pixels) are determined as being a nonbackground portion.

condition 1: L>threshold level $T_{w1}$ condition 2: L>$T_{w2}$($T_{w2}$<$T_{w1}$) and there is an adjacent background portion.

The background portion determining processing is performed utilizing the features that, in general, the background region of a document has certain size and is continuous. This is the processing by which those portions found to be white portions at the step S2 are discriminated as being from either a background portion or a nonbackground portion of the document, such as white portions in low density areas of the dot pattern and photo image. Here, the threshold levels $T_{w1}$ and $T_{w2}$ represent those levels corresponding to the appearance and disappearance of the background portion, respectively. That is, the white portion whose length exceeds $T_{w1}$ in the horizontal direction is unconditionally determined as belonging to the background portion. Also any white portion adjacent to the background region in the down or vertical direction will be determined as belonging to the background portion if its length in the horizontal scanning direction exceeds $T_{w2}$. By so doing, a broader white portion and any connected (somewhat narrower) white portions are determined as belonging to the background portion. On the other hand, since those white portions fragmentally present in the gradation area, such as the dot pattern and photo image, are not connected to an external background portion and are smaller in size, they are not determined as being the background portion.

Figure 7:
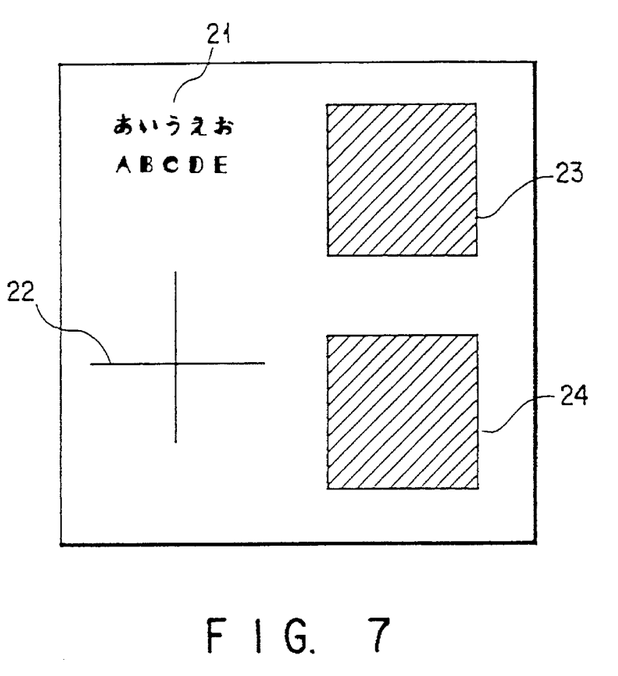
FIG. 7 is a view showing a result of determining a background portion of the expanded image in FIG. 6.

Here, if $T_{w1}$=1 mm and $T_{w2}$=about 0.25 mm are selected, the white portions in the dot pattern 23 and photo image 24 will be prevented from being incorrectly determined as being the background portion and only the original background portion is determined as such. Put in another way, individual characters and lines, as well as the dot patterns and photo image, are determined as belonging to those connected-nonbackground portions. FIG. 7 shows a result of determination made on the background portion against the expansion image V in FIG. 6, noting that the white and black portions in FIG. 7 represent the background and nonbackground portions, respectively. Since the expansion processing is made, before a later-described step S3, on the black areas in the binary image (step S2), there is less chance that a low area percentage portion, that is, a low density portion in the dot pattern, otherwise liable to be determined as being from the background portion, will be erroneously determined as such. It is, therefore, possible to improve the accuracy with which the background portion is determined.

Subsequent to the background portion determining step S4 as shown in FIG. 2, determination is performed on those isolated portions in the character/line region at step S4 as shown in FIG. 2. Of a nonbackground portion bounded by the background portions on a given horizontal scanning line and having a length smaller than $T_{w3}$, the binary image (expansion image V) obtained subsequent to the expansion processing is determined as a horizontal isolated portion if being composed of black pixels. At step S3, the character/line portion and dot pattern/photo image portion are determined as belonging to nonbackground portions, but, of these nonbackground portions as shown in FIG. 7, the character/line portions are isolated while, on the other hand, the photo image/dot pattern portions are connected together. Normally, the character size is below a few millimeters while, on the other hand, the gradation portion, such as the dot pattern and photo image, is over a few centimeters. Handwritten characters and lines, such as a rule and figure, are over a few centimeters in total area. Since, however, these are composed of narrow lines, they appear as narrow spots in the horizontal direction (unless being parallel with the horizontal direction). In consequence, when the threshold value $T_{w3}$ is selected as being, for example, about 10 mm, the character/line portion is discriminated as a horizontal spot (except that it is parallel with the horizontal direction), and the gradation portion is discriminated these do not take the form of a horizontal isolated spot.

Step S5 determines those vertical isolated spots in the character/line portion as shown in FIG. 2. Here, examination is made on both (a) whether or not there is any background portion determined as such by step S3 in a $P_w$ pixel range in the up direction relative to some black pixel of those binary pixels involved and (b) whether or not there is a white pixel in a $P_w$ pixel range at the down direction relative to the binary pixels. These pixels, satisfying both conditions (a) and (b), are regarded as being vertical isolated pixels (step S5). In the processing at step S5, those lines parallel with the horizontal direction, not distinguishable at the processing at step S4 as shown in FIG. 2, are distinguished because they are vertical isolated pixels. Here, $P_w$ represents the number of pixels having maximal distinguishable line width and, in the present embodiment, $P_w$=4.

If the latter condition (b) at step S5 is replaced by a condition (c) "whether or not there is a background portion in the $P_w$ pixel range in the down direction", then this is fitted to the original purport of the present invention and it is possible to improve the accuracy with which the distinguishing processing is performed. According to the present invention, processing progresses from the standpoint of the restriction of the circuit size while distinguishing the background portion and isolated portions in units of one line at a time from above. Therefore, the condition (b) is used to examine the area, below those pixels of interest, because confirmation has not yet made on the determination of the background portion in this lower area. However, any errors resulting from this distinction are small, If, by adding a few lines of memory, the determination of the background portion can be made a few lines faster than determination of the isolated portion, it is possible to distinguish a vertical isolated portion from the rest under the condition (c) above.

Figure 8:
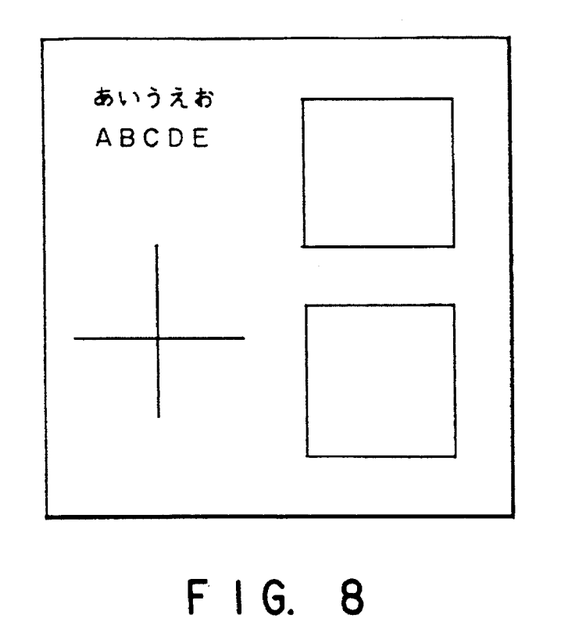
FIG. 8 is a view showing a result of distinguishing a character/line portion on the present embodiment.

Finally, those pixels of horizontal and vertical isolated portions distinguished at steps S4 and S5 are finally distinguished as the character/line portions or gradation portions (step S6). By so doing, it is possible to distinguish those characters and lines, containing a long line in the horizontal direction, from the character/line portions. FIG. 8 shows a result of distinguishing the character/line portions and the gradation portions as obtained at step S6. In this case, the character/line portions are represented as they are and the gradation portions are represented as blank portions.

According to the present invention, as shown in FIG. 8, only black portions of the character/line portions are distinguished and the background portion is not distinguished from the character/line portion. In the case where it is preferable to determine the character/line portion containing the background portion, it is only necessary to treat the character/line portion in a manner to contain that area determined as the background portion at step S3.

A practical arrangement of the image field distinguishing section 4 will be explained below with reference to FIG. 10.

The image field distinguishing section 4 comprises a comparator 101, delay circuits 102, level determining section 103, vertical expansion processing section 104, horizontal expansion processing section 105, run converting section 106, attribute correction section 107, horizontal isolated portion determining section 108, run memory section 109, run decoding section 110, vertical isolated portion determining section 111 and logical sum section 112.

Figure 10:
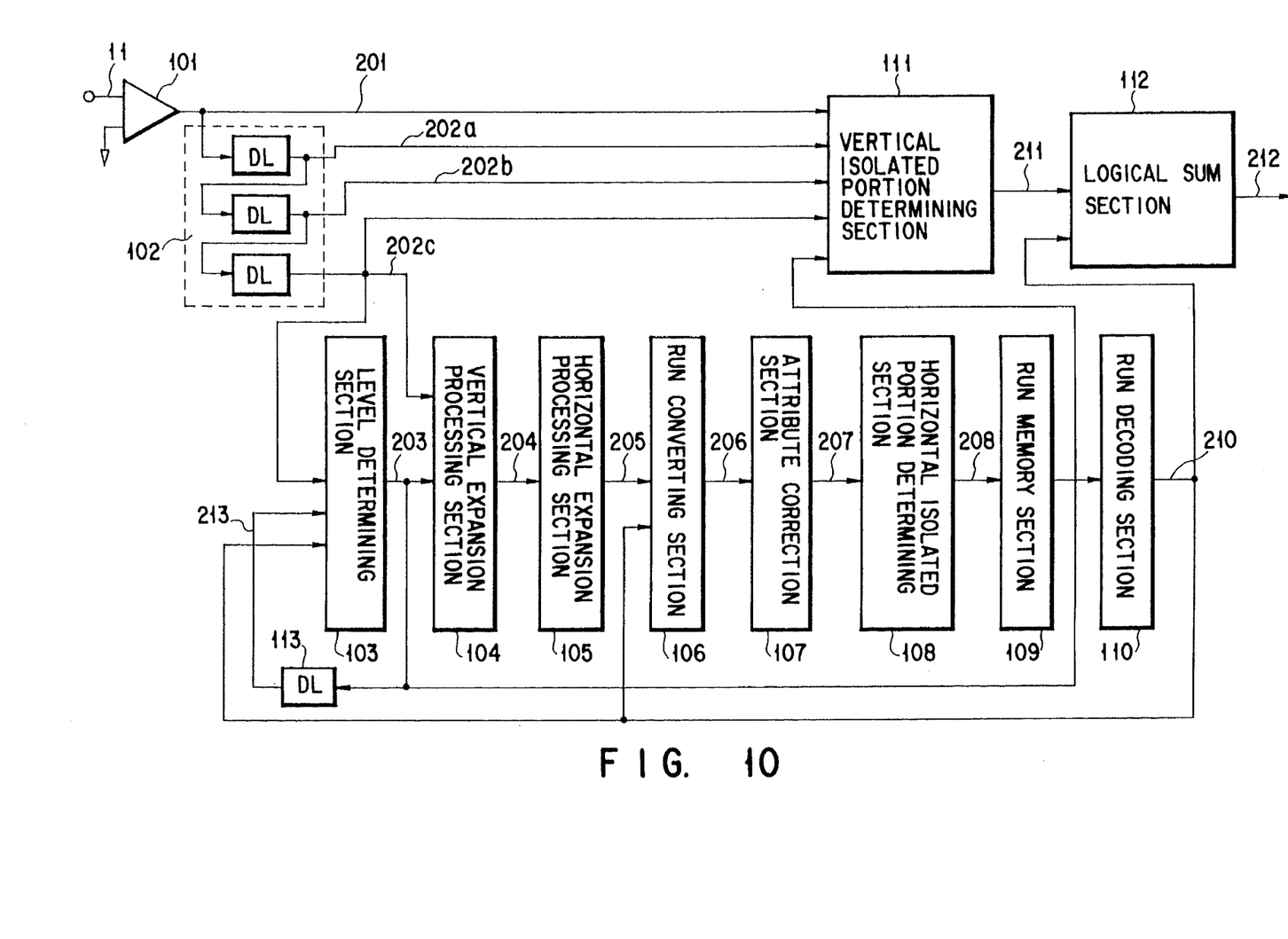
FIG. 10 is a view showing an arrangement of an image field distinguishing apparatus according to the present invention.

Simply stated about the correspondence between FIGS. 10 and 2, the comparator 101 is used to provide a binary image at step S1. The vertical expansion processing section 104 and horizontal expansion processing section 105 perform expansion processing on those black portions at step S2. The run converting section 106 and attribute correction section 107 are used to determine the background portion at step S3. The horizontal isolated portion-determining section 108 and vertical isolated portion determining section 111 are performed at steps S4 and S5, respectively, and the logical sum section 112 performs processing at step S6.

In FIG. 10, the image signal 11 input from the image input section 1 is supplied to the comparator 101 where it is generated as a binary image signal 201. In order to obtain four lines-ahead information, the binary image signal 201 is input to a delay circuit 102, comprised of three cascade-connected one-line delay circuits. These provide delay signals 202a to 202c on the corresponding lines. In the image field distinguishing section 4, the signal is delayed by an amount corresponding to a total of four lines, three lines for the delay circuit 102 and one line for the line memory section. Through being omitted in FIG. 1, in order to time the input signals of the high image, resolution processing section 2, gradation processing section 3 and image field distinguishing section 4, the image signals sent to the high resolution processing section and gradation processing section 3 are similarly delayed by an amount corresponding to the four lines. Here, the three-line delayed signal 202c is output as a binary image signal for a pixel to be processed.

The level determining section 103 determines the level of a current line level signal 203 by referring to the binary image signal of the pixel to be processed, that is, three-line delayed binary image signal 202c and one line-prior attribute signal 210 and level signal 213 of that overlying pixel. The determining rule is as shown in Table 1.

| binary image signal | overlying pixel attribute signal | overlying pixel level signal | determining level |
|---|---|---|---|
| white | white | L | L + 1 |
| white | black | L | 0 |
| black | background/white | L | 0 |
| black | nonbackground | L | 10 (sufficiently great value) |
| black | black | L | L + 1 |

In the case where a pixel to be processed is a white pixel, the level signal 203 represents the distance to a black pixel, while, in the case where the pixel to be processed is a black pixel, the level signal 203 represents the distance to a level a pixel corresponding to the background portion. It is to be noted that, in the case where any white pixel of the nonbackground portion is present near the background pixel against the pixel to be processed, the level of the level signal 203 takes a sufficiently great value (10 in Table 1). The level signal 203 thus determined is referred to by the later-described vertical expansion processing section 104 and vertical isolated portion determining section 111 and delayed by the one-line delay circuit 113 by an amount corresponding to one line and fed, as a one line-prior level signal 213, back to the level determining section 103.

Referring to the current line level signal 203 from the level determining section 103 and binary image signal 202c of the pixel to be processed, the vertical expansion processing section 104 determines a vertical expansion signal 204 based on the rules of Table 2. Since, in the case that the to-be-processed pixel is a white pixel, a corresponding level signal represents at the distance to any black pixel, the vertical expansion signal 204 represents a signal to which the black pixel is expansion-processed by an amount corresponding to the Py pixel length.

| binary image signal | level signal | expansion signal |
|---|---|---|
| black | don't care | black |
| white | less than Py | black |
| white | greater than Py | white |

The horizontal expansion section 105 generates an expansion signal 205, based on the vertical expansion signal 204, under the following rules.

| | |
|---|---|
| a condition 1: | In the case where any black pixel is present adjacent to a white pixel in the horizontal direction, the Px pixel length following that black pixel is converted unconditionally to the black pixel. |

The expansion signal 205 obtained through the vertical expansion processing section 104 and horizontal expansion processing section 105 represents the expansion image V as set out above.

After the one-line expansion signal 205 has been converted to a signal corresponding to a run (a continuously running white or black pixel length) unit, the run converting section 106 determines whether or not any background portion is present in the run unit with reference to the one line-prior attribute signal 210 and a result of determination is treated as the run attribute. A run signal 206 output from the run converting section 106 has information about the run start position, run length and run attribute for each run. The respective run attribute is determined under Table 3.

| kinds of runs | attribute of adjacent overlying pixel of a run | determining attribute |
|---|---|---|
| black | | nonbackground portion/black |
| white | all are nonbackground portions | nonbackground portion/white |
| white | there is a background signal | background signal |

The attribute correction section 107 corrects the run attribute representing whether or not the background portion corresponds to a run signal 206 output from the run converting section 106. That is, the attribute correction section corrects the run attribute by reference to the run length and outputs a signal 207 as a corrected run signal. The rules under which the run attribute is corrected are shown in Table 4.

| run attribute | run length R | "corrected" run attribute |
|---|---|---|
| nonbackground/black | — | nonbackground/black |
| nonbackgroung/white | R < Tw1 | nonbackground/white |
| nonbackground/white | R ≥ Tw1 | background/white |

| run attribute | run length R | "corrected" run attribute |
| --- | --- | --- |
| background/white | R < Tw2 | nonbackground/white |
| background/white | R ≧ Tw2 | background/white |

The horizontal isolated portion determining section 108 determines a horizontal isolated portion from the run attribute of a run signal 207 fed from the attribute correction section 107. In a practical case, among a run array found by the background portion, examination is made for a run array whose sum length is smaller than Tw3 and a horizontal isolated run is determined as having a black attribute in the run array involved. The horizontal isolated portion determining section 108 delivers a signal as a run signal 208 containing the run attribute. The run signal 208 output from the horizontal isolated portion 108 has any of four kinds of run attributes, that is, a background/white, nonbackground/white, nonbackground/black and horizontal isolated nonbackground/black.

The run signal 208 output from the horizontal isolated portion determining section is stored in the line memory 109 as a one-line unit and supplied to the line decode section 110 to provide a time sequence attribute signal 210. The attribute signal 210 is fed back to the level determining section 103 and run converting section 106 and referred to in the line determination of the next line and run conversion.

On the other hand, the vertical isolated portion 111 receives a binary image signals 201 and 202a to 202c and level signal 203 and determines the vertical isolated portions. The binary image signals 201 and 202a to 202c are those signals four lines to one line faster in time than for the pixel to be processed. If any of these binary image signals 201 and 202a to 202c corresponds to a white pixel, the level of the level signal 203 is smaller than "4" and binary image signal 202c, that is, the 4 line delayed signal, corresponds to black, then a vertical isolated signal becomes a "1". Otherwise it will be as a "0".

The logical sum circuit 112 takes a logical sum of the vertical isolated signal 211 and horizontal isolated signal 210 output from the run decoder section 110. This logical sum is output as a final image field distinguishing signal 212.

In the image field distinguishing processing of the present invention, all steps S1 to S6 as shown in FIG. 2 are not necessary. It may be possible to omit the vertical isolated portion determining processing at step S5, for example, and to use a result of determination of the horizontal isolated portion (step S4) as a result of distinguishing the image field. Further, it is also possible to omit the expansion processing at step S2 and to perform the background portion determining processing on the binary image obtained at step S1. Even in the arrangement of the practical image field portion distinguishing section, it is possible to properly omit the respective function runs.

Explanation will be made on the image recording section 6 in FIG. 1A. According to the present embodiment, an electrophotographic printer, in particular, a laser printer, is employed for the image recording section. As well known in the art, the laser printer is of such a type that, by modulating a laser beam for illumination onto a photosensitive body in accordance with an image signal, an electrostatic latent image corresponding to an image signal is formed on the photosensitive body and then developed with a toner whereby it is possible to perform image recording. In this case, the recording density per pixel is determined by an amount the photosensitive body which is exposed. The amount of exposure can be controlled by the intensity of the laser beam and its exposure time. The density gradation level per pixel can be enhanced by increasing the number of control levels. A greater control number leads to a hardware restriction and hence a cost restriction. According to the present invention, for example, four control levels are used and controlled by a corresponding signal.

In order to represent a normal gradation image, it is necessary to employ about 100 gradation levels or more and it is not sufficient to use just four control levels per pixel. According to the present invention, therefore, a multivalued error diffusion method is used as the procedure for representing the gradation image. Since the multivalued diffusion method is a multivalued version of a conventionally known binary error diffusion method, it is possible to represent adequate gradation characteristics without involving any marked texture emerging from the use of the binary error diffusion method. According to the present embodiment, multivalued error diffusion processing is performed at the gradation processing section 3 in FIG. 1 and the image signal 11 output from the image input section 1 is converted to a four-valued recording signal.

ID. the multivalued error diffusion method, the gradation portion is represented with a plurality of sets of pixels and there is a drawback in that characters, lines, etc., have blurry edges. Further, the image reading system of the image input section 1 has its MTF, etc., lowered and, if the image signal 11 becomes flabby, the blurring becomes prominent and illegibility (in the case of a small character in particular). For this reason, an image, if requiring a higher resolution such as that of characters/lines, etc., may be subjected to different processing. In the present invention, such proceeding is carried out at the high image resolution section 2. Practically, after the image signal 11 has been passed through a high-pass enhancement filter, the high image resolution processing section 2 subjects it to four-valued processing to obtain a high resolution recording signal. In this way, corresponding characters and lines, even if being lower in MTF, are reproduced, by the image reading system, with sharp edges.

The distinguishing signal 14 output from the image field distinguishing section 4 is input to a signal select section 5. In accordance with the distinguishing signal 14, the signal select section 5 selects a high image resolution recording signal 12 (from the high image resolution processing section 2) for the character/line portion and gradation recording signal 13 (from the gradation processing section 3) for the gradation portion and sends a corresponding signal to an image recording section 6. Even if a document contains a character/gradation-mixed image, it is possible to reproduce the character/line portions sharply and the gradation portions with a better gradation level and to reproduce a high-quality image in a gradation/resolution-compatible manner irrespective of the kinds of documents involved.

The image field distinguishing processing of the present invention can reduce a distinction error as compared with the conventional method but, even in this case, there is still a possibility that some error will occur. For example, there is a possibility that, for example, a noise-like isolated spot will be distinguished as being a character/line portion and that the gradation portion of more low shades will be distinguished as being the character/line portion. Further, a bold-face-character may be distinguished as being from a gradation portion. These defects are usually not practically prominent, but, if processing is done by the high image resolution processing section 2 and gradation processing section 3 on a greatly deviated δ-characteristic and if the δ-characteristic is prominent in the processing by the high resolution processing section 2, then there is a possibility that an erroneously distinguished portion may sometimes become prominent.

Figure 11:
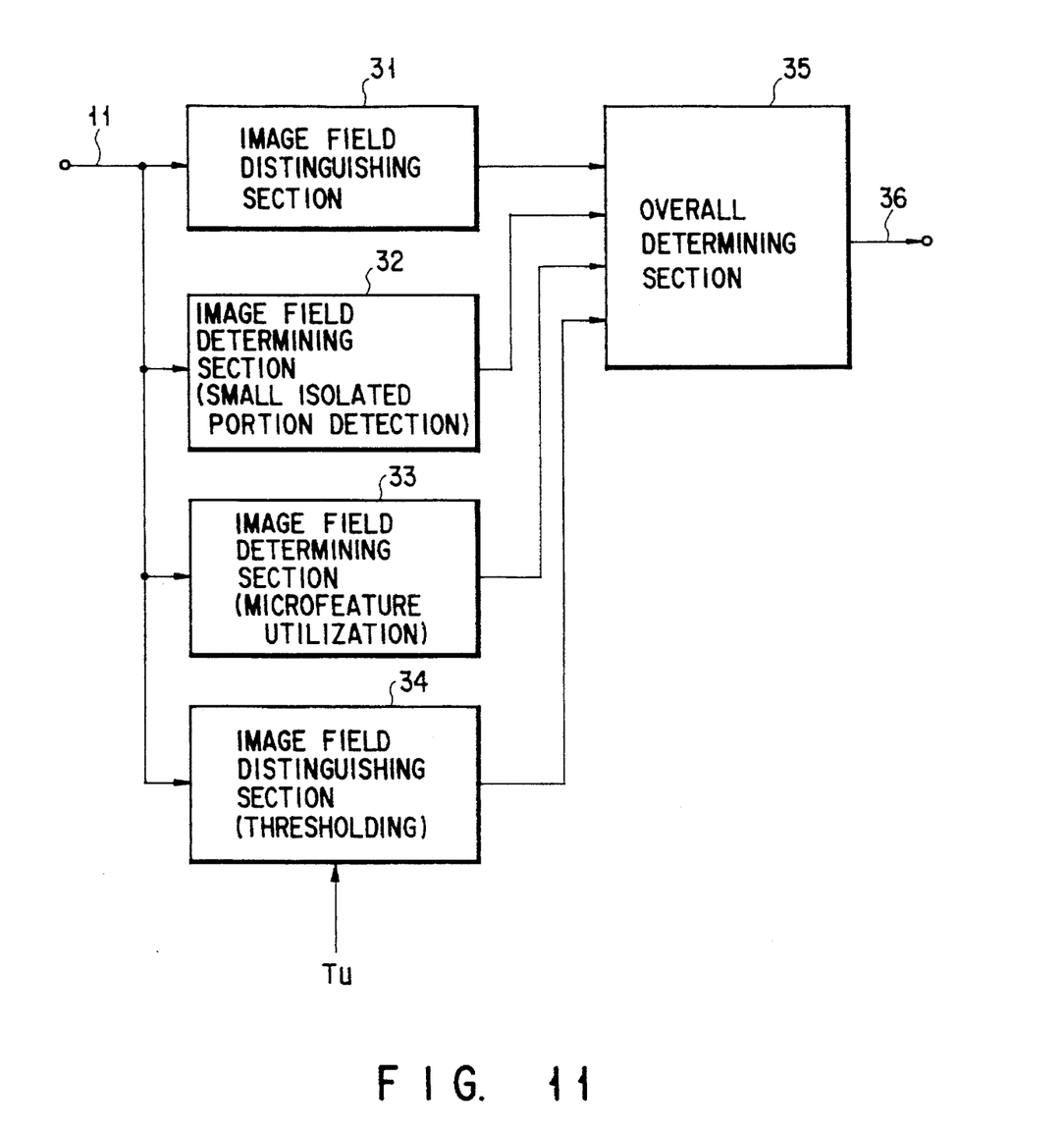
FIG. 11 is a view showing an image field distinguishing apparatus according to another embodiment of the present invention.

FIG. 11 shows a view showing an improved arrangement of an image field distinguishing apparatus according to another embodiment of the present invention. That is, an image field distinguishing section 31 based on the previous embodiment is combined with other types of image field distinguishing sections 32 to 34, thereby reducing a distinguishing error and image degradation. In FIG. 11, the image field distinguishing section 32 detects a small isolated spot of, for example, 2×2 pixels and subjects it to image field distinguishing processing so that it is treated as a gradation portion. The image field distinguishing section 33 performs image field distinguishing processing through the utilization of microfeatures as in the prior art. For example, JPN PAT APPLN KOKAI Publication 58-3374 discloses such a technique for image field distinguishing processing. The image field distinguishing section 34 compares the density or an original image to a give threshold level Tu (for example, 0.5 in terms of reflectance) and portions of an original image with densities lower than Tu are subjected to image field distinguishing processing so that it is treated as being a gradation portion. The results of image field distinctions by these image field distinguishing sections 31 to 34 are integrated by a total determined section 35 and a result of this determination is delivered as the image field distinguishing signal 36.

The present invention can be variously changed or modified without departing from the spirit and scope of the present invention. Although, according to the present embodiment, a 4-valued control type electrophotographic means (laser printer) has been used for the image recording section 6, the present invention is not restricted thereto. Similar advantages can also be obtained even if use is made of, for example, an ink jet recording and a thermal recording system as well as a recording system using a 2, 4 or more control levels. In the embodiment above, a digital filter, such as a high-pass enhancement filter, is used for the high image resolution processing section 2, but dynamic threshold processing may be made for switching a 4-valued threshold value to a peripheral-pixel density. Further, although, in the described embodiment, the multivalued error diffusion method has been used, a multivalued dithering method, etc., may be used.

Figure 12:
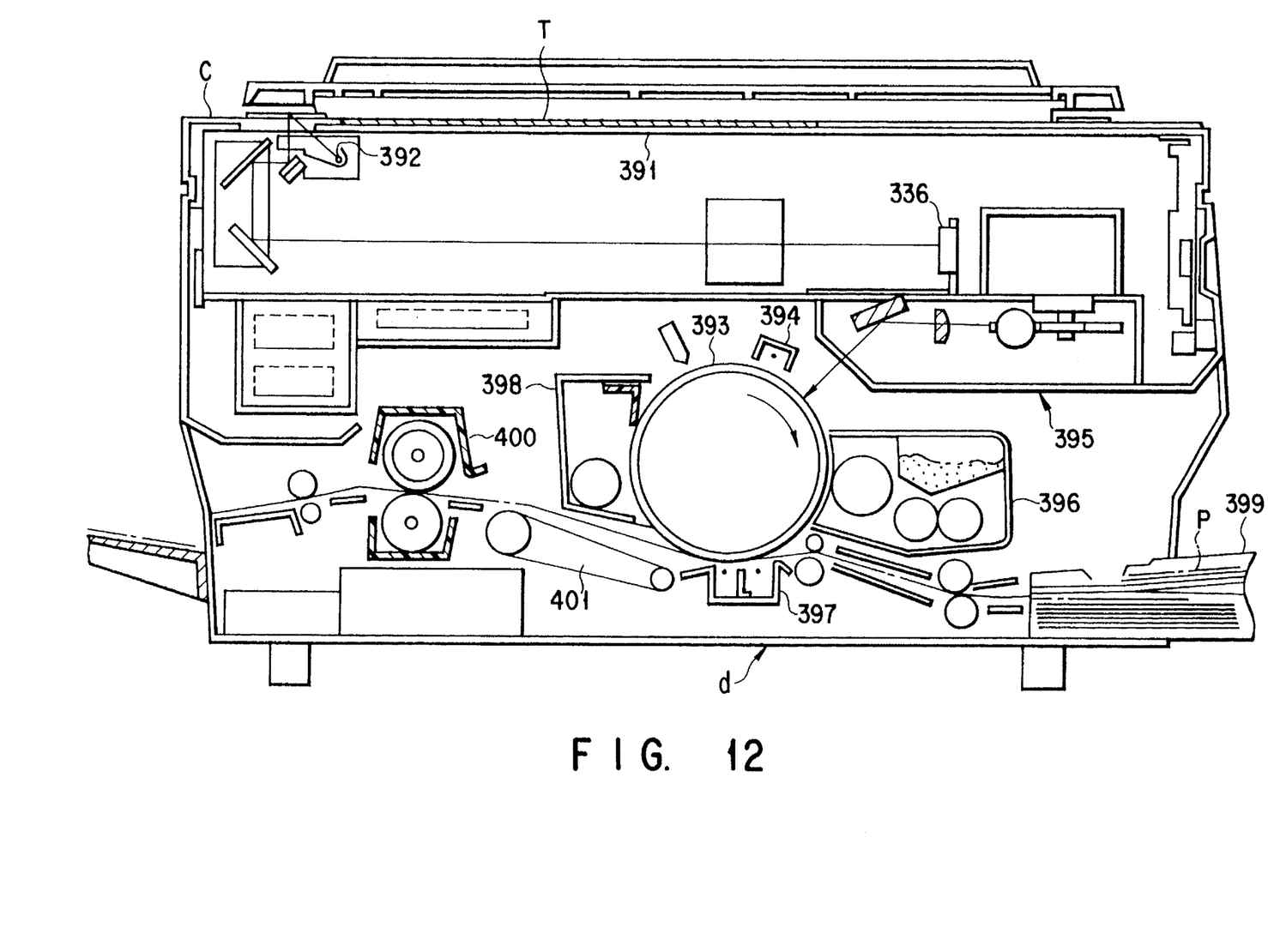
FIG. 12 is a cross-sectional view showing one example of a digital image copying apparatus equipped with the image field distinguishing apparatus of the present invention.

The inner arrangement of a digital copying machine will be explained below with reference to FIG. 12.

The digital copying machine comprises a scanner section C for optically reading image information on a document and a printer engine d for outputting the image information on a recordable material, that is, a copying sheet.

The scanner section C comprises a document rest base 391 for settings to-be-copied document, a light source 392 for illuminating the document T placed on the document rest base, and CCD sensor 336 for photo-electrically converting light, which has been reflected from the illuminated document T, and for converting the reflected light to an image information signal.

A reflector is disposed on the side of the optical source 392 to allow illumination light which comes from the light source 392 to be effectively focused onto the document T. Between the light source 392 and the CCD sensor 336 are provided a plurality of mirrors for bending a light path through which light is directed from the document T to the CCD sensor 336. That is, light reflected from the document is passed, by a lens, for example, and the reflected light to be focused on a focal surface of the CCD sensor 336.

A document presser is disposed above the document rest base 391 to set the document relative to the document rest base 391. The document presser can be replaced by, for example, a semi-automatic document feeder (SDF), automatic document feeder (ADF), etc., in accordance with the size of the digital copying machine or its copying capacity.

The image forming section d has a cylindrical photoelectric conversion element or photosensitive drum 393, rotatable in a desired direction by a motor, not shown, etc., charged with a desired potential and illuminated with a light beam to allow a potential on the illuminated area to vary.

Around the photosensitive drum 393 are located a charger 394 for imparting a desired potential to the drum 393, laser unit 395 for outputting an ON/OFF laser beam in accordance with image information, developing unit 396. The developing unit 396 develops an electrostatic latent image, which is formed on the photosensitive body 394 using a laser beam of the laser unit 395, with a visualizing agent, that is, a toner. There is also a transfer unit 397 for allowing the toner which is developed on the photosensitive body 394 by the developing unit 396 to be transferred to a recordable material, that is, a copying sheet supplied from a sheet supply section to be later described.

A cleaner unit 398 is arranged around the photosensitive drum 394 on a conveyance path downstream of the transfer unit 397 to remove the toner remaining on the surface of the photosensitive body 393 and to erase a potential variation which is created by the laser beam on the photosensitive body 393 so that the next image is formed on the photosensitive body.

Between the developing unit 396 and the transfer unit 397 is provided a sheet supply section 399 which allows the copying sheet to be transferred to the transfer unit 397 so that a toner image on the photosensitive body 393 may be formed.

At a subsequent stage of the transfer unit 397 and in a direction in which a copying sheet with a toner image transferred by the transfer unit 397 is separated from the photosensitive body 393, a fixing unit 400 and conveying unit 401 are provided. The fixing unit is used to fix the toner image to the copying sheet and the conveying unit is provided between the fixing unit 400 and the transfer unit 397 to convey the copying sheet toward the fixing unit 400.

As set out above, according to the present invention, in the image field distinction utilizing the determination of the background region, a black area is expansion processed against the binary image signal. Then a background portion is determined based on the size of white portions of the binary image signal and continuity of the white portion and a character/line portion and gradation portion are distinguished based on the size of the black portions of the binary signal for a nonbackground portion subsequent to the expansion processing. By so doing it is possible to correctly distinguish between a dot pattern and a gradation portion without erroneously determining a dot image area as a background portion.

According to the present invention, a black portion of below a given threshold value is treated as a character/line portion and other black portions are treated as gradation portions. In addition to this image field distinguishing processing, the following image field distinguishing processing is also carried out. That is, depending upon whether or not there are any background portions or white portions among those neighboring pixels in the vertical-up direction or the vertical-down direction, examination is made of whether or not the black portion is a character/line portions. By so doing, those fine lateral lines, such, as a rule, can be correctly distinguished as a character/line portion.

By combining together the high image resolution processing and gradation reproducing processing appropriate for the above-mentioned image field distinguishing processing, it is possible to remarkably improve a recording image quality in those portions liable to be erroneously determined through the distinguishing processing. Practically, both the dot pattern portion and gradation portion are well reproduced and, in addition to this advantage, it is also possible to reproduce fine lateral lines sharply.

Further, according to the present invention, an image field is distinguished utilizing the features of a microstructure of the document image and, as compared with the conventional system utilizing a micro-shading variation in features involved. Therefore, is possible to beautifully reproduce fine characters of about 5 points without imparting any hard tone to gradation edges.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus for performing predetermined processing with respect to an image on a document, the image on the document having a character/line portion, a gradation image portion, and a background portion which is distinct from the character/line portion and the gradation image portion, the image processing apparatus comprising:

scanning means for repeatedly scanning the image on the document in a main scanning direction, with the scanning means being shifted in a sub scanning direction between the repeated scans in the scanning direction, thereby outputting image data including a plurality of values which represent image densities of the image on the document;

binary image data preparation means for preparing binary image data which expresses the image data as white pixel data when the value of the image data is smaller than a predetermined value and which expresses the image data as black pixel data when the value of the image data is equal to or larger than the predetermined value;

expansion image data preparation means for preparing expansion image data by converting a predetermined number of white pixel data adjacent to the black pixel data into black pixel data on the basis of the binary image data so as to convert the white pixel data between the black pixel data corresponding to the gradation image portion to black pixel data; and identifying means for identifying a portion of the image data as not belonging to the character/line portion, by checking a consecutive number of black or white pixel data of the expansion image data in the main scanning direction or the sub scanning direction.

2. An image processing apparatus according to claim 1, further comprising:

determining means for determining the portion, identified by the identifying means as not belonging to the character/line portion, as the background portion when a consecutive number of white pixel data of the expansion image data in the main scanning direction is larger than a second predetermined number, or when a consecutive number of white pixel data of the expansion image data in the main scanning direction is larger than a third predetermined number and image data adjacent to the white pixel data in the sub scanning direction has been determined as the background portion, with the third predetermined number being smaller than the second predetermined number.

3. An image processing apparatus according to claim 1, further comprising:

determining means for determining the portion, identified by the identifying means as not belonging to the character/line portion, as the gradation image portion when a consecutive number of black pixels of the expansion image data in the main scanning direction is larger than a second predetermined number.

4. An image processing apparatus according to claim 1, wherein the expansion image data preparation means includes:

first conversion means for converting a second predetermined number of white pixel data of the binary image data which are adjacent in the main scanning direction to black pixel data of the binary image data into black pixel data; and second conversion means for converting a third predetermined number of white pixel data of the binary image data which are adjacent in the sub scanning direction to black pixel data of the binary image data into black pixel data.

5. An image processing apparatus according to claim 4, wherein the second predetermined number is larger than a number of pixels between dots in the gradation image portion, and is smaller than a number of pixels between lines in the character/line portion.

6. An image processing apparatus for performing predetermined processing with respect to an image on a document, the image on the document having a character/line portion, a gradation image portion, and a background portion which is distinct from the character/line portion and the gradation image portion, the image processing apparatus comprising:

scanning means for repeatedly scanning the image on the document in a main scanning direction, with the scanning means being shifted in a sub scanning direction between the repeated scans in the scanning direction, thereby outputting image data including a plurality of values which represent image densities of the image on the document;

binary image data preparation means for preparing binary image data which expresses the image data as white pixel data when the value of the image data is smaller than a predetermined value and which expresses the image data as black pixel data when the value of the image data is equal to or larger than the predetermined value;

expansion image data preparation means for preparing expansion image data by converting a predetermined number of white pixel data adjacent to the black pixel data into black pixel data on the basis of the binary image data so as to convert the white pixel data between the black pixel data corresponding to the gradation image portion to black pixel data;

identifying means for identifying a portion of the image data as not belonging to the character/line portion, by checking a consecutive number of black or white pixel data of the expansion image data in the main scanning direction or the sub scanning direction;

first determining means for determining the image data as the background portion based on a consecutive number of white pixel data of the image data in the main scanning direction and the presence or absence of a previously determined background portion in the sub scanning direction; and second determining means for determining the image data as the gradation image portion based on the extent to which black pixel data of the image data are consecutive.

7. A method for performing predetermined processing with respect to an image on a document, the image on the document having a character/line portion, a gradation image portion, and a background portion which is distinct from the character/line portion and the gradation image portion, the method comprising the steps of:

repeatedly scanning the image on the document in a main scanning direction, while shifting in a sub scanning direction between the repeated scans in the scanning direction, thereby outputting image data including a plurality of values which represent image densities of the image on the document;

preparing binary image data which expresses the image data as white pixel data when the value of the image data is smaller than a predetermined value and which expresses the image data as black pixel data when the value of the image data is equal to or larger than the predetermined value;

preparing expansion image data by converting a predetermined number of white pixel data adjacent to the black pixel data into black pixel data on the basis of the binary image data so as to convert the white pixel data between the black pixel data corresponding to the gradation image portion to black pixel data; and identifying a portion of the image data as not belonging to the character/line portion, by checking a consecutive number of black or white pixel data of the expansion image data in the main scanning direction or the sub scanning direction.

8. An image processing apparatus for distinguishing character/line portions, gradation portions and background portions of a document, the image processing apparatus comprising:

scanning means for scanning the document and outputting an image density data consisting of a plurality of image density values corresponding to image densities of the document;

binarization means for converting the image density data to binary image data of black and white pixels depending on whether an image density value exceeds a predetermined threshold value;

expansion means for converting the binary image data to expansion image data of black and white pixels, such that white pixels of the binary image data which are within a predetermined distance to a black pixel of the binary image data will be converted to black pixels in the expansion image data so as to convert the white pixel data between the black pixel data corresponding to the gradation image portion to black pixel data;

first determining means for determining a number of consecutive black pixels in the expansion image data in a horizontal direction, and for determining that these consecutive black pixels are a character/line portion if the number of consecutive black pixels is below a second threshold value; and second determining means for determining a number of consecutive black pixels in the expansion image data in a vertical direction, and for determining that these consecutive black pixels are a character/line portion if the number of consecutive black pixels is below a third threshold value.

9. An image processing apparatus for distinguishing character/line portions, gradation portions and background portions of a document, the image processing apparatus comprising:

scanning means for scanning the document and outputting an image density data consisting of a plurality of image density values corresponding to the image densities of the document;

binarization means for converting the image density data to binary image data of black and white pixels depending on whether an image density value exceeds a predetermined threshold value;

expansion means for converting the binary image data to expansion image data of black and white pixels, such that white pixels of the binary image data which are within a predetermined distance to a black pixel of the binary image data will be converted to black pixels in the expansion image data so as to convert the white pixel data between the black pixel data corresponding to the gradation image portion to black pixel data;

first determining means for determining a number of consecutive white pixels of the expansion image data in a horizontal direction;

second determining means for determining whether the number of consecutive white pixels exceeds a second threshold value;

third determining means for determining whether the number of consecutive white pixels exceeds a third threshold value, with the third threshold value being smaller than the second threshold value;

fourth determining means for determining whether the number of consecutive white pixels is adjacent to a previously determined background section in a vertical direction; and fifth determining means for determining that the consecutive number of white pixels is part of the background section if the second determining means determines that the second threshold value has been exceeded, or if the third determining means determines that the third threshold value has been exceeded and the fourth determining means determines that the number of consecutive white pixels are adjacent to a previously determined background area.

* * * * *